United States Patent
Heilmann

(10) Patent No.: US 12,168,326 B2
(45) Date of Patent: Dec. 17, 2024

(54) METHOD FOR PRODUCING A TEST SPECIMEN

(71) Applicant: Deutsches Zentrum für Luft-und Raumfahrt e.V., Bonn-Oberkassel (DE)

(72) Inventor: Lennert Heilmann, Bremen (DE)

(73) Assignee: DEUTSCHES ZENTRUM FÜR LUFT-UND RAUMFAHRT E.V., Bonn-Oberkassel (DE)

( * ) Notice: Subject to any disclaimer, the term of this patent is extended or adjusted under 35 U.S.C. 154(b) by 651 days.

(21) Appl. No.: 17/297,598

(22) PCT Filed: Nov. 27, 2019

(86) PCT No.: PCT/EP2019/082761
§ 371 (c)(1),
(2) Date: Dec. 17, 2021

(87) PCT Pub. No.: WO2020/109395
PCT Pub. Date: Jun. 4, 2020

(65) Prior Publication Data
US 2022/0097313 A1 Mar. 31, 2022

(30) Foreign Application Priority Data
Nov. 29, 2018 (DE) ..................... 10 2018 130 330.0

(51) Int. Cl.
*B29C 65/82* (2006.01)
*B29C 65/00* (2006.01)
(Continued)

(52) U.S. Cl.
CPC .......... *B29C 65/8223* (2013.01); *B29C 65/48* (2013.01); *B29C 66/004* (2013.01);
(Continued)

(58) Field of Classification Search
CPC ... B29C 65/8223; B29C 65/48; B29C 66/004; B29C 66/721; B29C 66/729;
(Continued)

(56) References Cited

U.S. PATENT DOCUMENTS 2,797,713 A * 7/1957 Hoffacker ............. D21F 1/0036
139/411
3,486,957 A * 12/1969 Cooper ............... B29C 65/7441
242/525

(Continued)

FOREIGN PATENT DOCUMENTS

DE        691 13 761 T2    5/1996
DE   10 2010 011 750 A1   9/2011
(Continued)

OTHER PUBLICATIONS

DE-102011010384-A1—English (Year: 2012).*
(Continued)

*Primary Examiner* — David Z Huang
*Assistant Examiner* — Fatemeh Esfandiari Nia
(74) *Attorney, Agent, or Firm* — WCF IP

(57) ABSTRACT

The invention relates to a method for producing a test body (30) for mechanically destructively testing a materially bonded joining connection, wherein the method comprises the following steps:
  providing an areal fiber composite substrate formed from a fiber composite material which has a fiber material and matrix material in which the fiber material is embedded,
  applying at least one test fabric and an adhesive to a substrate surface of the areal fiber composite substrate, and
  curing the adhesive, and therefore a materially bonded joining connection is produced between the test fabric and the substrate surface by way of the cured adhesive,
(Continued)

wherein a Dutch-weave fabric and/or a square-mesh fabric is provided as the test fabric.

19 Claims, 5 Drawing Sheets

(51) Int. Cl.
    *B29C 65/48*     (2006.01)
    *B29K 305/00*     (2006.01)
    *G01N 19/04*     (2006.01)

(52) U.S. Cl.
    CPC .......... *B29C 66/721* (2013.01); *B29C 66/729* (2013.01); *B29C 66/81455* (2013.01); *G01N 19/04* (2013.01); *B29K 2305/00* (2013.01); *G01N 2203/0091* (2013.01); *G01N 2203/0298* (2013.01)

(58) Field of Classification Search
    CPC ............ B29C 66/81455; B29C 66/723; B29C 66/1122; B29C 66/472; B29C 70/342; G01N 19/04; G01N 2203/0091; G01N 2203/0298; B29K 2305/00
    See application file for complete search history.

(56) References Cited

U.S. PATENT DOCUMENTS

| | | | |
|---|---|---|---|
| 5,315,820 A * | 5/1994 | Arnold | B29C 70/08 |
| | | | 428/116 |
| 5,653,836 A | 8/1997 | Mnich et al. | |
| 5,760,806 A * | 6/1998 | Oda | B41J 2/17513 |
| | | | 347/87 |
| 5,834,082 A * | 11/1998 | Day | E04C 2/296 |
| | | | 428/56 |
| 2009/0061144 A1 * | 3/2009 | Kismarton | B29C 70/549 |
| | | | 156/227 |
| 2011/0166311 A1 * | 7/2011 | Ellringmann | B32B 37/12 |
| | | | 156/332 |
| 2012/0090762 A1 | 4/2012 | Del Sarto | |
| 2013/0062469 A1 | 3/2013 | Cengiz | |
| 2014/0326074 A1 | 11/2014 | Van Voast et al. | |
| 2016/0121591 A1 * | 5/2016 | MacAdams | B29C 66/721 |
| | | | 156/307.3 |
| 2019/0107480 A1 | 4/2019 | Kuntz et al. | |
| 2019/0263072 A1 * | 8/2019 | MacAdams | C09J 163/00 |
| 2020/0130289 A1 | 4/2020 | Heilmann | |
| 2021/0283891 A1 * | 9/2021 | MacAdams | B32B 37/12 |

FOREIGN PATENT DOCUMENTS

| | | | | |
|---|---|---|---|---|
| DE | 102011010384 A1 * | 8/2012 | ........... | B29C 70/443 |
| DE | 10 2017 113 430 A1 | 12/2018 | | |
| EP | 3527641 A2 | 8/2019 | | |
| FR | 3089297 A1 | 6/2020 | | |
| WO | 2018/199032 A1 | 1/2018 | | |
| WO | 2018233928 A1 | 12/2018 | | |
| WO | 2019/215294 A1 | 11/2019 | | |

OTHER PUBLICATIONS

Heilman et al., "Proofed Bonding—A Novel Method for Verifying Adhesion in Adhesively Bonded Composite Repairs," ECCM18—18th European Conference on Composite Materials, Athens, Greece, Jun. 24-28, 2018.

* cited by examiner

METHOD FOR PRODUCING A TEST SPECIMEN

The invention relates to a method for producing a test body for mechanically destructively testing a materially bonded joining connection.

Materially bonded joining by means of adhesive or adhesive materials places very high demands on the materials to be processed and the processing processes. Since adhesive bonding is a special process, the quality of a finished joining connection cannot be verified completely by non-destructive methods. It is therefore common practice to determine an admissible parameter space for the processing process for producing the materially bonded joining connection by means of generic test bodies and then to support the manufacturing process by maintaining this parameter. In the process qualification, test bodies are correspondingly produced and mechanically destructively tested for each combination of materials and processing parameters in order to verify the admissibility of the respective parameter set. This requires very extensive testing programs, it being possible that costs which are considerable in some cases are incurred on account of the testing complexity.

A particular problem posed by such tests relates to the quality of the adhesive connection (adhesion) of the adhesive to the parts to be joined. The test body types and testing methods which exist for the purpose of verifying the adhesion are in some cases very complex to produce, test and evaluate. An established method for adhesion testing that supplies acceptable results for metal bonds thus exists by way of DIN-EN 2243-2 (roller peel test metal-metal), for example. It is increasingly also the case, however, that materials of different types are joined, in the case of which for example parts to be joined that correspond to fiber composite structures and are made of a wide variety of material types and material groups are to be joined in a materially bonded manner. The methods known from DIN-EN 2243-2 cannot be used in all cases in this respect, this applying in particular to fiber composite materials.

Known from L. Heilmann, P. Wierach, M. Wiedemann: "Proofed bonding—a novel method for verifying adhesion in adhesively bonded composite repairs", ECCM18-8th European Conference on Composite Materials, Athens, Greece, Jun. 24-28, 2018 are a method for checking the joining surface using a tear-off test textile and also the production of a test piece for checking the adhesion of a joining connection, in which method and production the test textile is a large-meshed square-mesh fabric. The meshes produced by the weave (openings within the fabric, also referred to as pores) serve here as penetration aids for the adhesive into the fabric in order to thus bring about a fixed connection of the square-mesh fabric used to the joining surface by way of the adhesive. In this respect, the square-mesh fabric is distinguished by pores or openings in a projection orthogonal to the plane of the square-mesh fabric. By pulling off the test fabric, the adhesive becomes fractured here in the region of the meshes or pores and it is possible here to investigate in more detail in order to check the joining surface per se.

The production of a test body using such a square-mesh fabric, however, has the disadvantage inter alia that the test body requires the edges of the fabric to be sealed, since otherwise the fabric would tear during the mechanical test. The tearing of the fabric, however, causes falsifications of the test result, and therefore large tolerances for the manufacturing process have to be allowed for based on checks with test bodies of this type. It has additionally been shown that the sealing of the edges during the production of the test body means a considerable additional outlay and requires significantly larger substrates. In addition, it was possible to empirically determine that the required width of the sealing edge depends based on the fabric used and the orientation or the angle of the fabric relative to the testing direction and also on the strength and layer thickness of the adhesive deposited. In this respect, a sealing edge which is too narrow leads to tearing of the fabric, while a sealing edge which is too wide leads to falsification of the measurement result and test result.

In addition, coarse-meshed fabrics with thick threads are often used, since thin and fine fabrics are too fragile and tear in the case of relatively strong adhesive bonds. However, it was possible to empirically determine the mesh fineness as an essential factor for the detection of defects.

In addition, the subsequently published DE 10 2017 113 430.1 discloses a method for checking a joining surface of a fiber composite component, in which method an areal test textile and an adhesive primer are likewise applied to a substrate, the adhesive primer is cured in a materially bonded manner and subsequently the test textile is pulled off, then the joining surface being checked by a qualitative assessment and/or a quantitative assessment. It is also the case here that square-mesh fabrics with a large porosity are used in order to obtain as cohesive as possible a fracture of the adhesive within the meshes.

Against this background, the object of the present invention is to specify an improved method for producing a test body which can be produced easily and cost-effectively and furthermore achieves an improved and unfalsified test result when materially bonded joining connections with different parts to be joined are being checked.

What is proposed is a method for producing a test body for mechanically destructively testing a materially bonded joining connection, wherein firstly an areal substrate is provided. In the further course of the method, a materially bonded joining connection which is to be checked using the test body is then created on this areal substrate.

The areal substrate may be for example a fiber composite substrate formed from a fiber composite material which has a fiber material and a matrix material in which the fiber material is embedded. An integral unit of fiber material and matrix material is formed by curing the matrix material in which the fiber material is embedded. The areal fiber composite substrate may in this case be provided in the cured state, with the result that the materially bonded joining connection is created on the cured surface of the substrate. It is also conceivable, however, that the areal fiber composite substrate is provided in a non-cured state, wherein the materially bonded joining connection together with the matrix material is then cured in the further process step.

Also conceivable, however, are other substrates or solid bodies composed of inorganic or organic materials and of metal, for example.

After providing the areal substrate, at least one test fabric and an adhesive or adhesive material is applied to the substrate surface of the areal substrate, wherein the adhesive or adhesive material is then cured in order to create a materially bonded joining connection between the test fabric and the substrate surface by way of the cured adhesive. The adhesive may also be cured in a variety of ways, for example by controlling the temperature of the adhesive, by curing at room temperature, by UV irradiation, moisture absorption etc.

It is now provided according to the invention that a Dutch-weave fabric and/or a square-mesh fabric is provided and used as the test fabric.

In this respect, in the context of the present invention, what is understood by a Dutch-weave fabric is a fabric which does not make it possible to identify any meshes (zero meshes) in the projection orthogonal to the plane of the fabric (or fabric surface) and is thus substantially opaque in these orthogonal projections. Nevertheless, on account the weave the Dutch-weave fabric has a permeability that can be identified in a perspective projection (for example 45 degrees). Consequently, the applied adhesive can also penetrate into the Dutch-weave fabric and through it, in order to be able to produce a material bond with the Dutch-weave fabric and the areal substrate. With the aid of the present invention and the use of a Dutch-weave fabric and/or a square-mesh fabric, it is thus possible to produce a test body which in particular no longer tears in its edge regions when the test body is used as intended. In this respect, after the adhesive cures, the test fabric in the form of the Dutch-weave fabric and/or square-mesh fabric provided is pulled off from the joining surface of the areal substrate, in order to be able to determine the capability for adhesion to the areal substrate surface, for example. On account of the fact that the test fabric of the test body according to the invention now no longer tears and the influence of a sealing edge on the test result is eliminated, the test result overall is no longer falsified, as a result of which a more accurate test result overall is produced. It has moreover been shown that the characteristic values exhibit a lesser extent of scattering, with the result that the investigated influences on the bond quality can be better identified. Moreover, such a test piece can be produced very easily and efficiently, and therefore in addition the costs can also be greatly reduced.

A square-mesh fabric is preferably a fabric made from stainless steel, in particular chromium-containing steel, which in contact with oxygen forms a chromium oxide layer on the surface. This makes it possible in particular to dispense with sealing of the edges.

In this respect, it is possible for the square-mesh fabrics to be calendered or uncalendered. It has been shown that calendering of the square-mesh fabric increases the fabric strength and that on the other hand, under certain conditions, calendered fabrics make it possible to detect errors better than uncalendered fabrics. The square-mesh fabrics may have a linen weave and/or twill weave. The pore size of the square-mesh fabric may be in the range of from 25 µm to 1000 µm, preferably however in a range of from 75 µm to 300 µm.

Uncalendered square-mesh fabric may lie an open area (formed by the pores) of 50% (in the case of adhesive with low strength) or less, or of 40% (in the case of adhesive with a high-strength adhesive bond) or less. In the case of calendered square-mesh fabrics, an open area (formed by the pores) may be 60% (in the case of adhesives with low strength) or less, or and 50% (in the case of adhesive with a high-strength adhesive bond) or less. In this case, the proportion in percent relates to the total area of the square-mesh fabric.

In the case of calendered square-mesh fabrics, the fabric thickness is reduced by at least 10%, advantageously by at least 30%, in relation to the uncalendered fabric.

The surface of the square-mesh fabric may have a chromium oxide layer or have an etched surface for increasing the surface roughness for good adhesion of the adhesive. The surface may, however, also be coated, e.g. with an adhesion promoter.

In this respect, the test fabric is preferably applied to the substrate such that the orientation of the fabric, i.e. the fiber angle of the fabric, is defined in terms of the later peeling direction. An application of the fabric in the direction of the warp threads or the weft threads is preferably predefined. A film adhesive may furthermore be applied as adhesive, wherein the state of the adhesive is identical in terms of its dimensions to the dimensions of the test fabric.

The Dutch-weave fabric and/or square-mesh fabric generally has a plurality of warp threads and a plurality of weft threads that cross the warp threads. According to one embodiment, for this purpose the warp threads and/or the weft threads are formed from a metallic material, in particular from a ferrous material, such as steel, for example. As a result, the forces occurring when the test fabric is being pulled off can be readily dissipated. Also conceivable, however, are other materials, such as plastics, polymers, titanium or the like, for example.

According to a further embodiment, the weft threads have a smaller cross section than the warp threads, or vice versa, as a result of which no meshes are produced in the projection orthogonal to the plane of the Dutch-weave fabric, while the permeability of the Dutch-weave fabric is exhibited in a perspective projection on the Dutch-weave fabric. This makes it possible to achieve stability and strength in conjunction with permeability.

In a further embodiment, the Dutch-weave fabric is woven in such a way that the warp threads are arranged spaced apart from one another, while the weft threads are arranged adjoining one another and thus woven as a block.

In one embodiment, in a first step the test fabric is applied to the areal substrate, while then in a subsequent second step the adhesive is deposited onto the applied test fabric. In particular in conjunction with controlling the temperature of the adhesive for the purpose of curing, the adhesive is then penetrated into the Dutch-weave fabric and/or square-mesh fabric, since, as a result of controlling the temperature of the adhesive, it generally melts and liquefies. By virtue of the penetration of the adhesive into the Dutch-weave fabric and/or square-mesh fabric, then, after it has penetrated through, the substrate surface is also wetted, with the result that a materially bonded joining connection is produced after the adhesive has cured. In this embodiment, here the Dutch-weave fabric and/or square-mesh fabric is applied to the joining surface, wherein then the adhesive is applied, and therefore initially the Dutch-weave fabric and/or square-mesh fabric is situated between the joining surface and the adhesive.

Of course, the reverse alternative in which firstly the adhesive is applied to the joining surface and then the Dutch-weave fabric and/or square-mesh fabric is applied is also conceivable, wherein it has been shown in this respect that the penetration of the adhesive through the Dutch-weave fabric and/or square-weave fabric may be only insufficient under certain circumstances. It is also conceivable, however, that the test fabric is firstly impregnated with the adhesive and then is applied with the infused adhesive.

According to one embodiment, the adhesive here may be provided and deposited in the form of a film adhesive, this simplifying the handling when the test body is being produced.

According to one embodiment, the adhesive is deposited onto the test fabric before the test fabric is applied to the areal substrate.

According to one embodiment, firstly a separating film is applied in a subregion of the areal substrate, in order to prevent a materially bonded joining connection with the substrate in this region. In this case, the separating film in the subregion serves to create a tear-off tab after the adhesive has cured, and thus the test fabric can be torn off from the joining surface. The tear-off tab may also serve in this respect to clamp the test body into a corresponding test machine and thus cause the test fabric to tear off from the joining surface in an automated manner.

According to a further embodiment, after the adhesive has cured, the test body is divided into a plurality of individual test coupons by severing the test fabric. It has been shown that firstly the test body can be produced in its entirety and then, for example, can be separated into individual test coupons in a wet sawing process by severing the test fabric itself in the process. This has no negative effect at all on the later test result, wherein, after the division of the test body into the individual test coupons, the edge regions do not additionally have to be protected by edge sealing. Rather, the test body can be divided by simply severing the test fabric at the predefined points, wherein then the test coupon would be ready for use. In this respect, it is also possible to conjointly sever the substrate, without this having negative effects on the test result.

Accordingly, it is advantageous when no edge sealing is applied to the test fabric, in particular the Dutch-weave fabric. This saves time and costs.

As an alternative, however, it may also be provided that an edge sealing is applied, in particular in the case of a square-mesh fabric.

In a further embodiment, after applying the test fabric and the adhesive to the areal substrate, this test construction that has been produced in this way is covered by a vacuum covering, for example a vacuum film, subsequently evacuated and then the adhesive is cured, for example by controlling the temperature.

In one embodiment, a separating film, an aluminum film and/or one, two or more layers of tear-off fabric are arranged between the vacuum covering and the test construction.

The separating film arranged between the vacuum covering and the test construction advantageously ensures that an excess overflow of the adhesive is prevented. A very smooth and uniform surface of the adhesive layer can be created in particular by arranging an aluminum film with a thickness of more than 40 μm to 50 μm above the separating film. Consequently, a reproducible adhesive layer thickness can be guaranteed. At the same time, the layers of tear-off fabric deposited above the separating film ensure a defined adhesive layer thickness distribution and/or surface structuring.

The object is moreover also achieved by a method for mechanically destructively testing a materially bonded joining connection of a test body, wherein firstly a test body is produced according to the method described above. After the adhesive has cured, then the test fabric of the test body is pulled off, for example by means of a mechanical device, in order to mechanically destructively test the materially bonded joining connection between the substrate and the test fabric.

The peeling rate may be 25 to 1000 mm/min, preferably 100 to 500 mm/min. The peeling angle should be constant over the test length (0° to 180°, for example).

The invention will be explained in more detail in exemplary fashion with reference to the appended figures, in which.

Figure 1:
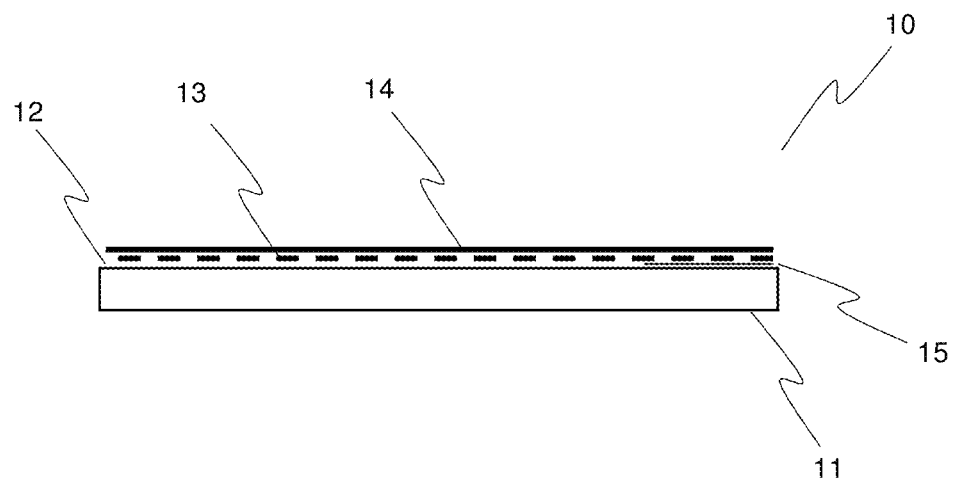
FIG. 1 shows a schematic sectional view through a test construction shortly before the production of the test body.

FIG. 1 shows a schematically greatly simplified illustration of a test construction 10, from which the test body according to the invention is to be produced by curing an adhesive. The test construction comprises an areal fiber composite substrate 11, which has a substrate surface 12. A test fabric 13 and an adhesive 14 in the form of a film adhesive are applied one after the other to this substrate surface 12. In addition, a separating film 15 is applied between the substrate surface 12 and the test fabric 13 in a separate region of the substrate surface 12, in order to avoid bonding of the adhesive 14 to the substrate surface 12 here. No materially bonded joining connection is accordingly formed in this region in which the separating film 15 is located, with the result that this region may be used in the manner of a tear-off tab or tear-off aid.

The areal fiber composite substrate 11 may be present in this respect in the already cured state, i.e. the matrix material has already been completely cured in a previous step. In a few usage situations, however, it is also conceivable that the adhesive 14 is cured collectively together with the matrix material of the areal fiber composite substrate 11.

Furthermore, it is also conceivable that firstly the adhesive 14 is applied and then the test fabric 13 is applied to the substrate surface 12 of the areal fiber composite substrate 11. However, it is also conceivable that firstly the adhesive 14 and the test fabric 13 are connected in a separate process, i.e. that the test fabric is impregnated with adhesive, and that the adhesive-impregnated test fabric is then applied to the areal fiber composite substrate 11.

In the exemplary embodiment of FIG. 1, the temperature of the test construction 10 formed in this way is controlled to produce the test body, as a result of which the adhesive 14 melts and penetrates into the test fabric 13. As a result of the penetration of the molten adhesive 14 into the test fabric 13, eventually the substrate surface 12 is also wetted by the adhesive 14, and therefore a materially bonded joining connection between the substrate surface 12 and the adhesive 14 with the test fabric 13 embedded therein is produced after the adhesive 14 has cured.

Figure 2:
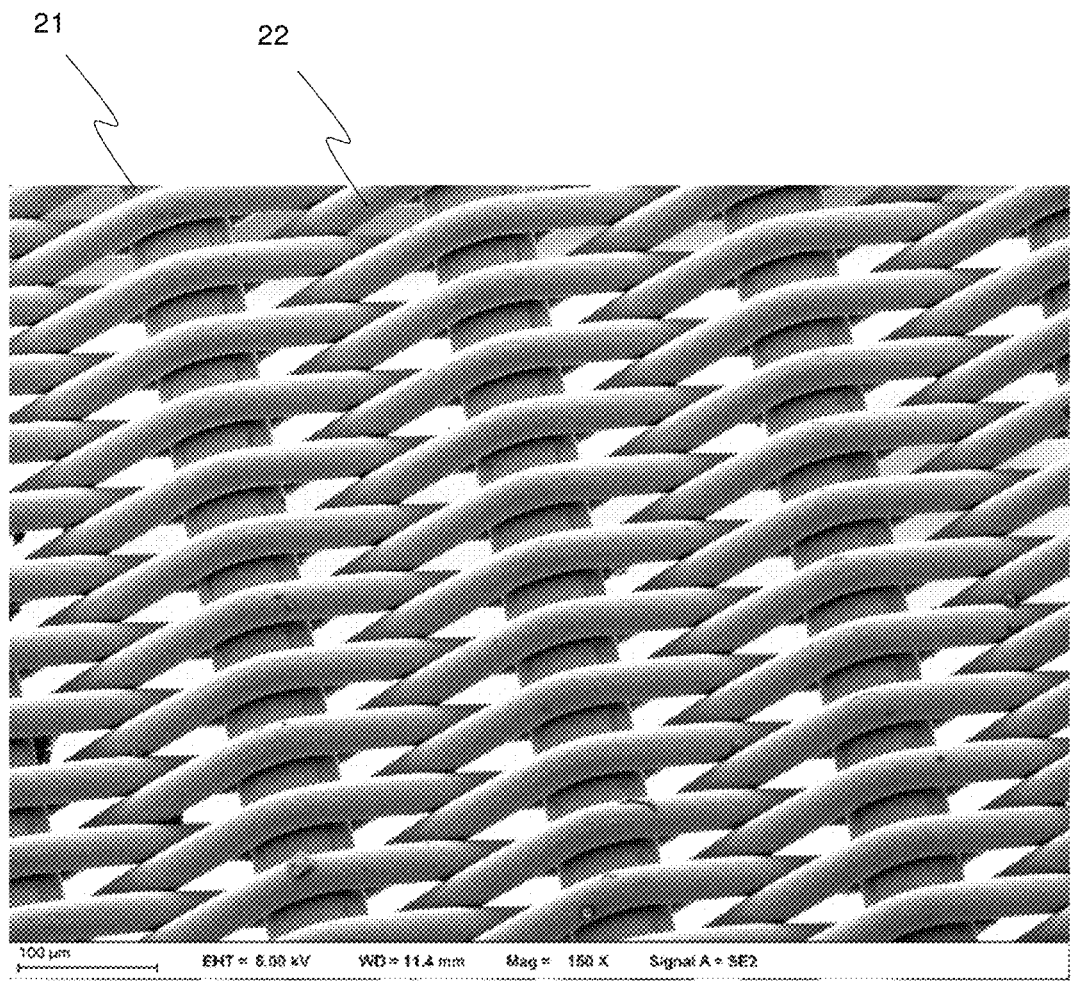
FIG. 2 shows a perspective illustration of a Dutch-weave fabric.

FIG. 2 shows a perspective illustration of a Dutch-weave fabric, which is formed from a plurality of warp threads 21 and a plurality of weft threads 22. In this respect, the warp threads 21 have a larger diameter or a larger cross-sectional extent than the weft threads 22. Here, a weft thread 22 always runs in an alternating manner over or under the next warp thread 21, which produces a braided fabric.

As can be seen in the exemplary embodiment of FIG. 2, a pore network by way of which the adhesive can penetrate to produce the test body is visible in a perspective projection on such a Dutch-weave fabric 20. However, since the weft threads 22 are always respectively placed as a block and adjoin the respectively neighboring weft threads, a mesh is not visible (zero meshes) in a projection orthogonal to the plane of the Dutch-weave fabric, this conferring its particular strength on the Dutch-weave fabric for the present usage situation, in particular in the edge region.

Figure 3:
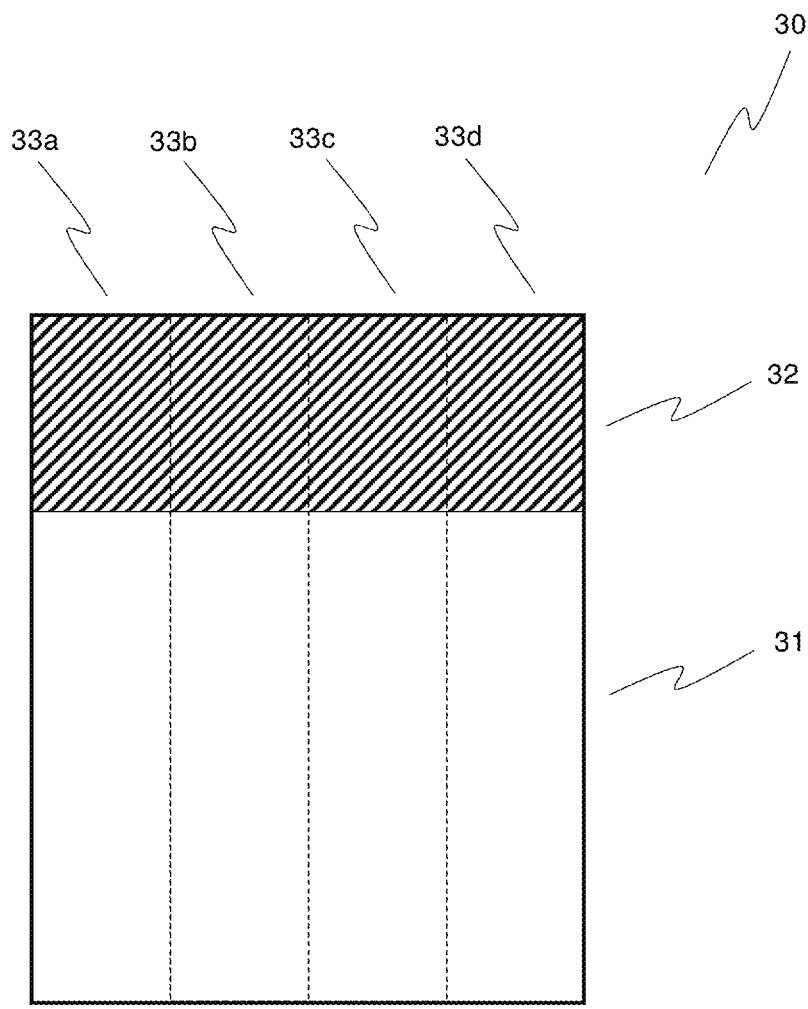
FIG. 3 shows a schematic illustration of the formation of individual test coupons.

FIG. 3 schematically shows the produced test body 30, which is subdivided into a test region 31 and into a tear-off region 32. No material bond with the areal fiber composite substrate is produced in the tear-off region 32 on account of the separating film lying therebeneath, and therefore here the Dutch-weave fabric is not materially bonded to the substrate. By contrast, in the test region 31, a materially bonded joining connection of the Dutch-weave fabric in conjunction with the adhesive has been brought about on the substrate surface.

The test body 30 produced in this way is then divided into a plurality of individual test coupons 33 by either severing the Dutch-weave fabric within the test region 31 and pulling off the fabric strips from the large, cohesive substrate, or by severing the Dutch-weave fabric together with the substrate, with the result that separate test coupons are created. In this respect, such a severing of the test body 30 may be performed by sawing, for example, wherein here a wet saw with a diamond cutting disk is preferably to be used, in order to ensure thermal influencing of the bond on the one hand and a high quality of the saw edge on the other hand.

On account of the Dutch-weave fabric used as test fabric, it is not necessary to seal the edge region after sawing up the test body 30 into the individual test coupons 33*a* to 33*d*, since here there is no risk of tearing during the testing of the test body 30.

In this respect, a test body 30 of quality can be produced from an areal fiber composite substrate that may have a thickness of 0.1 to 10 mm, preferably 1 mm in the case of unidirectional CFP materials. For the purpose of forming a pull-off tab, the tear-off region 32 should be at least 60 mm or longer, preferably 75 mm. The bonded length of the test region 31 should be at least 50 mm, preferably 200 mm, here. The width of a test coupon 33 here may be between 10 and 100 mm wide, preferably 25 mm.

As weave for the Dutch-weave fabric, for example, smooth braid (linen weave), twill braid, reverse braid, high-performance braid (with an increased level of throughflow), braids in duplex and triplex configurations. The fabric thickness here may be 0.05 to 0.5 mm, preferably approx. 0.10 to 0.15 mm. The porosity may be between 30 and 65%, preferably more than 50%, wherein high-performance braids with an increased level of throughflow are to be preferred. Stainless steel, for example, but also thermo-plastic filaments, are considered as the fabric material.

The surface of the Dutch-weave fabric may have a chromium oxide layer. In this respect, the surface may be etched in order to obtain an increased surface roughness for good adhesion of the adhesive. However, it is also conceivable that the surface is etched and coated, e.g. using an adhesion promoter.

Figure 4:
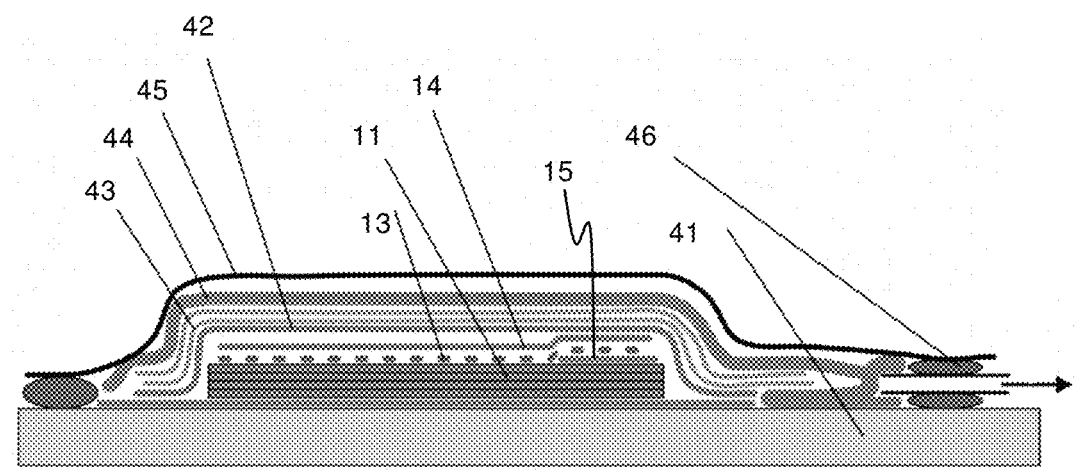
FIG. 4 shows a schematic illustration of a possible vacuum construction.

FIG. 4 schematically shows the vacuum construction 40 for producing a test body. In this case, firstly the test construction 10 known from FIG. 1 is created on a molding tool 41 with the substrate 11, the separating film 15, the Dutch-weave fabric 13 and the adhesive 14.

The test construction 10 formed in this way is then covered by a separating film 42. A tear-off fabric 43 is then applied to this separating film, onto which tear-off fabric an absorbent nonwoven 44 is then placed. Subsequently, the ensemble is covered with a vacuum film 45 and closed in a vacuum-tight manner at the edges using a sealing tape 46. Optionally, a thick aluminum film (greater than 40 μm to 50 μm, for example) may also be placed between the separating film and the tear-off fabric, in order to create a particularly smooth adhesive surface.

Optionally, a ventilating fabric 47 arranged in the region of the Dutch-weave fabric 13 within the test construction 10 may be provided, in order to allow the Dutch-weave fabric to be ventilated before being infused by the adhesive.

A particular feature of this vacuum construction 40 is that an excess flow of adhesive is prevented by the separating film 42 that lies on the adhesive 14. Consequently, a reproducible adhesive layer thickness can be guaranteed. At the same time, the two layers of tear-off fabric 43 deposited above the separating film 42 ensure a defined adhesive layer thickness distribution and/or surface structuring.

This vacuum construction 40 that has been produced in this way is then evacuated by way of a vacuum pump, wherein the adhesive is then cured by controlling the temperature and applying pressure. For this purpose, it is conceivable, for example, that after the vacuum construction 40 has been evacuated, it is introduced in an auto-clave clave in order to control the temperature of and apply a pressure to the vacuum construction 40.

Figure 5:
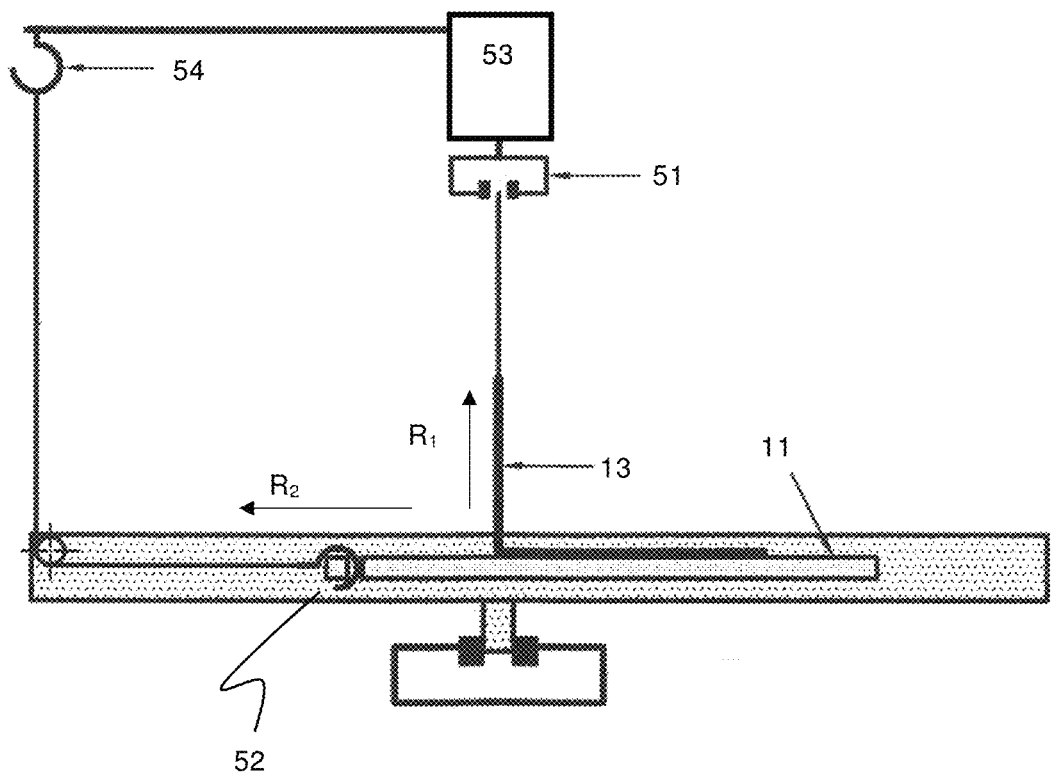
FIG. 5 shows a schematic illustration of a testing device.

FIG. 5 schematically shows a device 50 according to DIN-EN 1939:2003. Firstly, a cured test body 30 is inserted into the device 50, wherein the test fabric/Dutch-weave fabric 13 is fastened to a first fastening device 51 and the substrate 11 is fastened to a second fastening device 52. In the process, the first fastening device 51 is connected to a sensor device 53, in order to be able to detect the parameters which result from the test fabric 13 being torn off.

The testing device 50 is designed such that it pulls off the test fabric 13 in the direction $R_1$ orthogonal to the substrate 11. The second fastening device 52 is coupled to the movement in the direction $R_1$ via a fastening point 54, with the result that pulling off the test fabric 13 in the direction $R_1$ the substrate 11 performs a movement in the direction $R_2$, which is parallel to the plane of the substrate 11. This makes it possible to keep the peeling angle constant over the entire tearing-off operation.

It has been shown that peeling rates of 25 to 1000 mm per minute, preferably 100 to 250 mm per minute, are conceivable. The peeling angle may be provided between 90 and 180 degrees and should be constant over the entire test length. In accordance with an appropriate stipulation, the test temperature may fluctuate around the room temperature. The sample may be conditioned beforehand, i.e. it may be dry or damp saturated. In addition, it is conceivable that the test body is pretensioned and is thus given a prespecified bending radius, for example.

The peel diagram is evaluated substantially according to DIN-EN2243-2, or methods under standards. In this way, 175 mm of the sample can be peeled and the first 15 mm of the peel distance after the initial peak is reached are not yet evaluated. The subsequent mm of the peel distance are then evaluated. The remaining 10 mm of the peel distance are not evaluated. The fracture profile is assessed within the evaluation range. However, it is also possible to peel 180 mm of the sample, wherein the first 20 mm of the peel distance after the first force peaks are reached are not evaluated. The subsequent 150 mm of the peel distance are used for the evaluation, while the remaining 10 mm of the peel distance are no longer evaluated.

Accordingly, the fact that a test body produced by the method described in the present sent case is used for mechanically destructive testing using a testing device of this type is also encompassed by the present invention.

Advantageously, a roller peeling device, for example according to DIN EN 2243-2, or a similar design (e.g. according to ASTM D3167) may be used for testing the test coupons.

LIST OF REFERENCE SIGNS

10 Test construction
11 Areal fiber composite substrate
12 Substrate surface
13 Test fabric 14 Adhesive
15 Separating film
20 Dutch-weave fabric
21 Warp threads
22 Weft threads
30 Test body
31 Test region
32 Tear-off region
33 Test coupon
40 Vacuum construction
41 Molding tool
42 Separating film
43 Tear-off fabric
44 Absorbent nonwoven
45 Vacuum film
46 Sealing tape
47 Ventilating fabric
50 Testing device
51 First fastening device
52 Second fastening device
53 Sensor device
54 Fastening point
$R_1$ Peeling direction
$R_2$ Compensating movement

The invention claimed is:

1. A method for producing a test body for mechanically destructively testing a materially bonded joining connection, comprising:
   providing an areal substrate;
   applying at least one test fabric and an adhesive to a substrate surface of the areal substrate; and
   curing the adhesive, whereby a materially bonded joining connection is produced between the test fabric and the substrate surface which comprises a cured adhesive,
   wherein the at least one test fabric is selected from the group consisting of a Dutch-weave fabric and a calendared square-mesh fabric.

2. The method as claimed in claim 1, wherein the areal substrate is a fiber composite substrate formed from a fiber composite material which has a fiber material and a matrix material in which the fiber material is embedded.

3. The method as claimed in claim 1, wherein the at least one test fabric has a plurality of warp threads and a plurality of weft threads which cross the warp threads.

4. The method as claimed in claim 3, wherein one or more of the warp threads and the weft threads are formed from a metallic material.

5. The method as claimed in claim 3, wherein the weft threads have a smaller cross section than the warp threads.

6. The method as claimed in claim 3 wherein the at least one test fabric is the Dutch-weave fabric and is woven in such a way that the warp threads are spaced apart from one another, while the weft threads are arranged adjoining one another.

7. The method as claimed in claim 3 wherein the at least one test fabric is the Dutch-weave fabric and no meshes are visible in a projection on the Dutch-weave fabric.

8. The method as claimed in claim 1 wherein the applying step is performed by first applying the at least one test fabric to the areal substrate, and then second applying the adhesive by depositing the adhesive onto the at least one test fabric.

9. The method as claimed in claim 1 wherein the adhesive is provided and deposited as a film adhesive.

10. The method as claimed in claim 1 wherein the applying step is performed by first depositing the adhesive onto the at least one test fabric before the at least one test fabric is applied to the areal substrate.

11. The method as claimed in claim 1 further comprising applying a separating film in a region of the areal substrate in order to prevent a materially bonded joining connection with the substrate in the region of the areal substrate.

12. The method as claimed in claim 1 further comprising after the adhesive has cured, dividing the test body into a plurality of individual test coupons by severing the at least one test fabric.

13. The method as claimed in claim 12, wherein the test body is divided in such a way that the at least one test fabric is severed together with the areal substrate.

14. The method as claimed in claim 1 wherein no edge sealing is applied to the at least one test fabric.

15. The method as claimed in claim 1 further comprising covering by a vacuum covering at test construction comprised of the areal substrate, the at least one test fabric, and the adhesive, wherein the vacuum covering is applied by an evacuation procedure prior to the adhesive being cured.

16. The method as claimed in claim 15, wherein a separating film, an aluminum film and/or one, two or more layers of tear-off fabric are arranged between the vacuum covering and the test construction.

17. The method as claimed in claim 1 wherein the adhesive is cured by controlling the temperature.

18. A method for mechanically destructively testing a materially bonded joining connection of a test body, comprising:
   producing a test body as claimed in claim 1; and
   testing the materially bonded joining connection of the test body by pulling off the at least one test fabric.

19. The method of claim 4 wherein the metallic material is a ferrous material.

* * * * *